3,454,566
4-(N-SUBSTITUTED)AMINO-1-SUBSTITUTED
PHENETHYL PIPERIDINES
Adolf Lindenmann, Basel, Rudolf Süess, Bettingen, and Franz Troxler, Bottmingen, Switzerland, assignors to Sandoz Ltd. (also known as Sandoz A.G.), Basel, Switzerland
No Drawing. Filed Mar. 20, 1967, Ser. No. 624,145
Claims priority, application Switzerland, Mar. 22, 1966, 4,127/66
Int. Cl. C09b *23/02*; C07d *29/30*
U.S. Cl. 260—240
11 Claims

ABSTRACT OF THE DISCLOSURE

The present invention provides piperidine derivatives of formula:

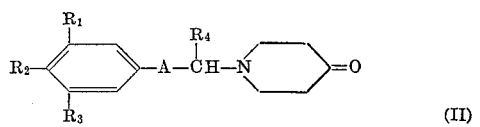

in which either each of $R_1$, $R_2$ and $R_3$ is hydrogen or methoxy, or $R_1$ is hydrogen, and $R_2$ and $R_3$ together are methylenedioxy, A is methylene, $R_4$ is hydrogen or methyl, and $R_5$ is hydrogen or benzyl, and the pharmaceutically acceptable acid addition salts thereof. These compounds exhibit a pronounced vasodilatory effect on the coronary vessels of the heart, and are further characterized by an anti-arrhythmical effect on the heart. The preparation of these compounds is furthermore described.

---

The present invention relates to new piperidine derivatives and possesses for their production.

The present invention provides piperidine derivatives of Formula I,

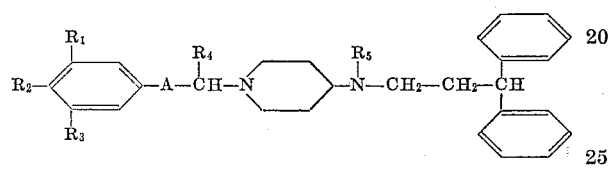

(I)

in which either each of $R_1$, $R_2$ and $R_3$ signifies a hydrogen atom or a methoxy radical, or $R_1$ signifies a hydrogen atom, and $R_2$ and $R_3$ together signify a methylenedioxy radical, A signifies a methylene radical, $R_4$ signifies a hydrogen atom or a methyl radical, and $R_5$ signifies a hydrogen atom or a benzyl radical, and their salts with organic or inorganic acids.

The present invention further provides the following processes for the production of Compounds I and their acid addition salts:

(a) A piperidone of Formula II,

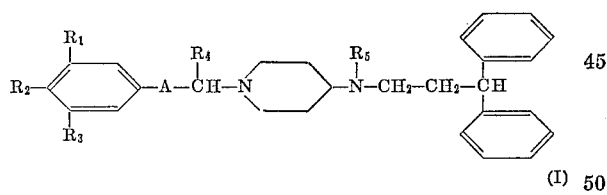

(II)

in which $R_1$, $R_2$, $R_3$, $R_4$ and A have the above significance, is reacted with 3,3-diphenylpropylamine, and the resulting imine of Formula III,

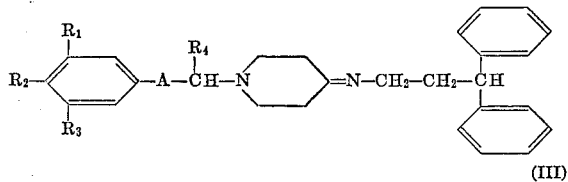

(III)

in which $R_1$, $R_2$, $R_3$, $R_4$ and A have the above significance, is reduced to yield the corresponding compound of Formula I, in which $R_5$ signifies a hydrogen atom, and when an acid addition salt is required, salification is effected.

(b) An amine of Formula IVa,

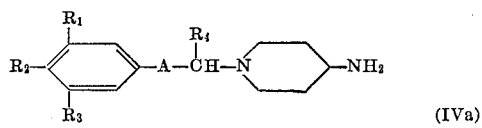

(IVa)

in which $R_1$, $R_2$, $R_3$, $R_4$ and A have the above significance, is reacted with 3,3-diphenylpropionaldehyde, and the resulting imine of Formula V,

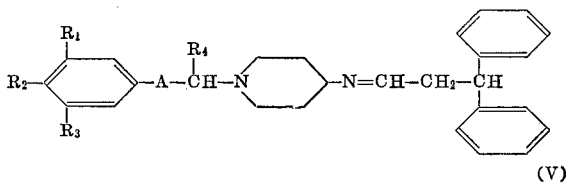

(V)

in which $R_1$, $R_2$, $R_3$, $R_4$ and A have the above significance, is reduced to yield the corresponding compound of Formula I, in which $R_5$ signifies a hydrogen atom, and when an acid addition salt is required, salification is effected.

(c) An amine of Formula IV,

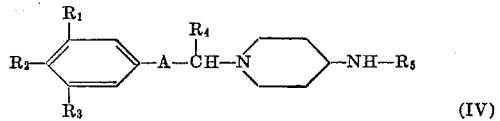

(IV)

in which $R_1$, $R_2$, $R_3$, $R_4$, $R_5$ and A have the above significance, is acylated with the chloride or bromide or, when $R_5$ signifies hydrogen, also with the azide or a lower alkyl ester of 3,3-diphenylpropionic acid, and the resulting amide of Formula VI,

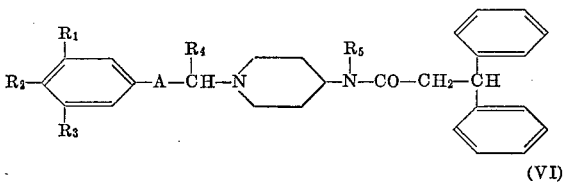

(VI)

in which $R_1$, $R_2$, $R_3$, $R_4$, $R_5$ and A have the above significance, is reduced with lithium aluminium hydride in an organic solvent which is inert under the reaction conditions, and, when a Compound I in which $R_5$ signifies a benzyl radical results, and a Compound I in which $R_5$ signifies a hydrogen atom is desired, the benzyl radical is split off hydrogenolytically, and, when an acid addition salt is required, salification is effected.

(d) An amine of Formula IV, in which $R_1$, $R_2$, $R_3$, $R_4$, $R_5$ and A have the above significance, is reacted with a compound of Formula VII,

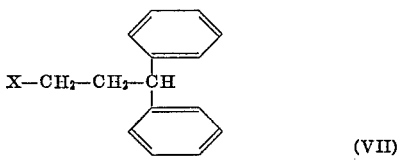

(VII)

in which X signifies the acid radical of a reactive ester, and, when a Compound I in which $R_5$ signifies a benzyl radical results, and a Compound I in which $R_5$ signifies a hydrogen atom is desired, the benzyl radical is split off hydrogenolytically, and when an acid addition salt is required, salification is effected.

(e) 4 - [N - benzyl - N - (3,3 - diphenylpropyl)amino] piperidine of Formula VIII

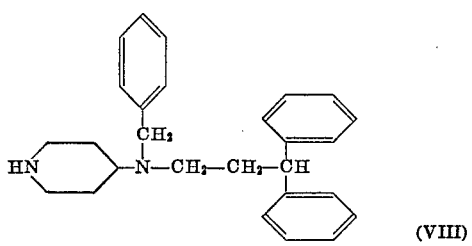

(VIII)

is acylated with a compound of Formula IX,

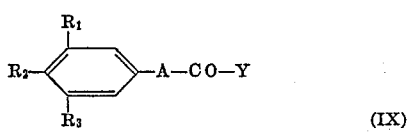

(IX)

in which $R_1$, $R_2$, $R_3$ and A have the above significance, and Y signifies a chlorine or bromine atom, and, when a compound of Formula I in which $R_5$ signifies a benzyl radical results, and a Compound I in which $R_5$ signifies a hydrogen atom is desired, the benzyl radical is optionally split off at this stage, and the resulting amide of Formula X,

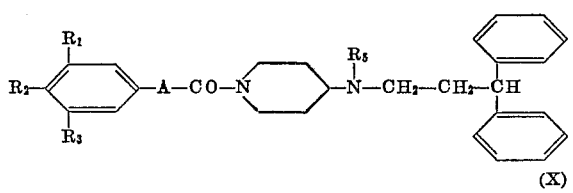

(X)

in which $R_1$, $R_2$, $R_3$, $R_5$ and A have the above significance, is reduced with lithium aluminium hydride in an organic solvent which is inert under the reaction conditions, to yield the corresponding compound of Formula I, in which $R_4$ signifies a hydrogen atom, and, when a Compound I in which $R_5$ signifies a benzyl radical results, and a Compound I in which $R_5$ signifies a hydrogen atom is desired, the benzyl radical is split off hydrogenolytically, and, when an acid addition salt is required, salification is effected.

A preferred method of effecting the processes (a) and (b) above is as follows: A mixture of the carbonyl component [compounds of Formula II in the case of process (a) or 3,3-diphenylpropionaldehyde in the case of process (b)] and the amino component [compounds of Formula IVa in the case of process (b) or 3,3-diphenylpropylamine in the case of process (a)] is heated to 50–150° C. for 1 to 3 hours, preferably in an inert solvent, e.g., benzene or toluene, at a temperature which permits the removal of the water, resulting during the reaction, from the mixture by azeotropic distillation. The resulting imine of Formula III or V is preferably not isolated, but reduced directly as crude product, optionally after evaporating any solvent which may be present.

This may, for example, be effected by hydrogenation over a metal catalyst, e.g., platinum, palladium or Raney nickel. For this purpose a lower alkanol or ethyl acetate is used as solvent, and hydrogenation is effected at room temperature or at a slightly elevated temperature and at normal or slightly elevated pressure. However, the imine may also be reduced by nascent hydrogen, e.g., with sodium in a boiling lower alkanol, e.g., ethanol, propanol or butanol. A complex alkali metal hydride may also be used as reducing agent. In this case the imine is treated in a lower alkanol at room temperature with sodium borohydride or with lithium aluminium hydride in an anhydrous organic solvent which is inert under the reaction conditions, e.g., ether, tetrahydrofuran or dioxane, at room temperature or at a slightly elevated temperature.

In accordance with another embodiment of the processes (a) and (b) the imine of Formula III or V is reduced in situ. This reaction may be effected as follows: A mixture of equimolar amounts of the carbonyl component and the amino component is treated in a suitable solvent, e.g., a lower alkanol or ethyl acetate, with hydrogen gas in the presence of a metal catalyst, e.g., palladium or platinum, whereupon the imine resulting is hydrogenated in situ to the desired final product I. The reaction is preferably effected at room temperature and at a slightly elevated pressure.

In accordance with the process (c), an amine of Formula IV, e.g., 1-[2-(3,4-dimethoxyphenyl)ethyl]-4-aminopiperidine, is acylated with the chloride or bromide of 3,3-diphenylpropionic acid at a temperature between 0° and 110° C. The reaction has a duration of 1 to 20 hours and may optionally be effected in a suitable organic solvent, e.g., benzene or toluene; the addition of an acid binding agent, preferably pyridine, is advantageous but not essential. Amines of Formula IV, in which $R_5$ signifies hydrogen, may also be acylated by reacting with 3,3-diphenylpropionyl azide at 0–110° C. or with a lower alkyl ester of 3,3-diphenylpropionic acid at 40–120° C.

Reduction is effected by treating the resulting amide of Formula VI, either as crude product or after further purification, with lithium aluminium hydride in an anhydrous organic solvent which is inert under the reaction conditions, e.g., tetrahydrofuran, dioxane or N-ethylmorpholine, at a temperature between 50° to 110° C. After 3 to 24 hours the excess reducing agent and the resulting complex are decomposed by the dropwise addition of methanol and subsequently a saturated sodium sulphate solution, filtration is effected and the filtrate is evaporated to dryness.

Any benzyl radical which may be present may be split off by shaking the reduction product with hydrogen in a suitable organic solvent, e.g., methanol, in the presence of a palladium catalyst.

In accordance with the process (d) the reaction of an amine of Formula IV with a compound of Formula VII, in which X signifies the acid radical of a reactive ester, e.g., preferably a chlorine or bromine atom or a p-toluenesulphonyloxy radical, may be effected by heating the two reactants in an organic solvent which is inert under the reaction conditions, e.g., benzene, toluene or xylene, preferably in the presence of an acid binding agent, e.g., potassium carbonate or pyridine, or a second mol of the compound of Formula IV. The reaction is preferably effected at the reflux temperature of the solvent and has a duration of about 2 to 20 hours.

The subsequent splitting off of any benzyl radical which may be present is effected by hydrogenation in the presence of a palladium catalyst as described above.

In accordance with the process (e), 4-[N-benzyl-N-(3,3-diphenylpropyl)amino]piperidine of Formula VIII is first acylated with a compound of Formula IX, e.g., 3,4,5-trimethoxyphenyl-acetic acid chloride, preferably in the presence of an acid binding agent, e.g., pyridine, triethylamine or potassium carbonate, or a second mol of the compound of Formula VIII. The reaction is effected in an organic solvent which is inert under the reaction conditions, e.g., benzene or toluene, at room temperature or at a slightly elevated temperature, and has a duration of a few minutes to one hour. If desired, the benzyl radical may be split off hydrogenolytically at this stage, or after the subsequent reduction with lithium aluminium hydride.

The resulting amide of Formula X, e.g., 1-(3,4,5-trimethoxyphenylacetyl)-4-[N-benzyl - N - (3,3 - diphenylpropyl)amino]piperidine, is then reacted with lithium aluminium hydride for one half to 24 hours in an anhydrous organic solvent which is inert under the reaction conditions, e.g., dioxane or preferably tetrahydrofuran. The reaction is effected at a temperature between 50° and 110° C., preferably at reflux temperature of the solvent used. Working up is effected by adding methanol to the cooled reaction mixture and subsequently adding a saturated aqueous sodium sulphate solution, filtering off the resulting precipitate and evaporating the filtrate.

To split off any benzyl radical which may be present the reduction product is taken up in a suitable organic solvent, e.g., methanol, and is shaken with hydrogen in the presence of a hydrogenation catalyst, preferably palladium.

The compounds of Formula I obtained by the processes described above may be isolated in the usual manner and purified in manner known per se, e.g., by crystallization or adsorption chromatography. Compounds I are basic compounds; with inorganic or organic acids they form stable, water-soluble salts which are crystalline at room temperature. Examples of acids for acid addition salt formation are hydrochloric, hydrobromic, sulphuric, fumaric, maleic, malonic, citric, tartaric, benzoic, methanesulphonic, p-toluenesulphonic and cyclohexylsulphamic acid.

The compounds II and IV used as starting materials may be produced from the corresponding phenylalkylamines of Formula XI,

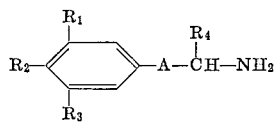

(XI)

in which $R_1$, $R_2$, $R_3$, $R_4$ and A have the above significance, which are known or may be produced by known reactions, e.g., as follows:

(1) Reaction of the correspondingly substituted benzaldehyde with hydroxylamine, nitromethane or nitroethane and reduction of the resulting oximes or $\omega$-nitrostyrenes;

(2) Reduction of the correspondingly substituted benzonitriles;

(3) Reaction of the correspondingly substituted acetophenones or phenylacetones with hydroxylamine and reduction of the resulting oximes.

The phenylalkylamines of Formula XI are then reacted with 2 mols of acrylic acid ethyl ester, and the resulting N,N-bis-(2-carbethoxy-ethyl) derivatives are subjected to an intramolecular ring closure by treating with a strong alkaline condensation agent, e.g., lithium hydride, followed by acid hydrolysis and decarboxylation of the resulting 3-carbethoxy-4-piperidone derivaties to give compounds of Formula II. The amines of Formula IV are obtained by reacting Compounds II with benzylamine or with hydroxylamine and subsequent reduction of the resulting imines or oximes, e.g. with nascent or catalytically activated hydrogen or with lithium aluminium hydride; any benzyl radical which may be present may be split off by hydrogenation over palladium.

The compound of Formula VIII is new, and together with the process for its production, also forms part of the present invention. It may be produced as follows: Diphenylpropylamine is condensed with a piperidone derivative of Formula XII,

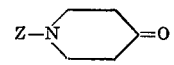

(XII)

in which Z signifies a protective radical, e.g., acetyl, benzoyl, carbethoxy or carbobenzyloxy, the resulting imine is reduced by catalytic hydrogenation or with sodium borohydride, the resulting 4-(3,3-diphenylpropylamino)piperidine derivative is benzylated, e.g., by reacting with a benzyl halide in the presence of an acid binding agent, and the protective radical Z is subsequently removed hydrolytically, e.g., by heating with an aqueous solution of hydrochloric acid in ethanol.

The compounds of Formula IX are obtained from the corresponding free carboxylic acids by reacting with thionyl chloride, phosphorus pentachloride or phosphorus tribromide.

The Compounds I have hitherto not been described in the literature; they have valuable pharmacodynamic properties. Thus, they produce a vasodilatation which leads to an improvement of peripheral blood circulation and under certain conditions to a lowering of arterial blood pressure. They have an especially pronounced vasodilatory effect on the coronary vessels of the heart, which is of rapid action and has a relatively long duration. This produces an increase in the blood supply of the heart muscles, accompanied by a lowering of the oxygen consumption in the heart muscles. The compounds are further characterized by an antiarrhythmical effect on the heart.

Due to these pharmacological properties the compounds are indicated for use in the treatment of various circulatory illnesses, for example angina pectoris and other forms of coronary illnesses, e.g., functional or organic coronary insufficiency. The compounds are also indicated for use in the treatment of disorders of the heart rhythm, including the various forms of tachycardia and tachyarrhythmia. The compounds may also be used in the treatment of peripheral circulatory disorders and various forms of high blood pressure (hypertonia). A suitable average daily dose is 10 to 200 mg., preferably administered 2 to 4 times daily.

The compounds of the invention or their water-soluble, physiologically tolerated acid addition salts, may be used as pharmaceuticals on their own or in the form of appropriate medicinal preparations, e.g., tablets, drageés or injectable solutions, for administration, e.g., enterally or parenterally. Aside from the usual inorganic and organic, pharmaceutically acceptable, inert adjuvants, e.g., lactose, starch, talcum, stearic acid, water, alcohols, glycerin, natural or hardened fats, oils or waxes, the preparations may also contain suitable preserving, stabilizing and wetting agents, solubilizers, sweetening or colouring substances and flavourings.

The term "in manner known per se" as used herein designates methods in use or described in the literature on the subject.

In the following nonlimitative examples all temperatures are indicated in degrees centigrade and are uncorrected.

Example 1.—1-[2-(3,4-dimethoxyphenyl)ethyl]-4-(3,3-diphenylpropylamino)piperidine A mixture of 5.0 g. of 1-[2-(3,4-dimethoxyphenyl)-ethyl]-4-piperidone and 4.0 g. of 3,3-diphenylpropylamine is heated to 110° for one and a half hours in a flask fitted with a vertical tube, whereby water drops are formed in the tube. Cooling is then effected, the resulting crude 1-[2-(3,4 - dimethoxyphenyl)ethyl] - 4 - (3,3 - diphenylpropylimino)piperidine is dissolved in 100 cc. of ethanol and 250 mg. of platinum oxide are added. Hydrogenation is effected at 40° at a pressure of 4 atms. for 3 hours, the catalyst is filtered off, the filtrate is concentrated by evaporation and 11 cc. of 3 N hydrochloric acid in ethanol are added to the oily residue. 20 cc. of ether are added and the mixture is allowed to crystallize; after recrystallization from methanol/ether 1-[2-(3,4-dimethoxyphenyl)-ethyl] - 4 - (3,3 - diphenylpropylamino)piperidine dihydrochloride has a M.P. of 278° with decomposition (slightly hygroscopic). The dihydrochloride sesquihydrate of the compound indicated in the heading has a M.P. of 260–263° (after crystallization from approximately 90% ethanol).

Example 2.—1-(1-phenylpropyl-2)-4-(3,3-diphenylpropylamino)piperidine

A mixture of 12.8 g. of 1-(1-phenylpropyl-2)-4-piperidone and 12.4 g. of 3,3-diphenylpropylamine is heated to 110° for one and a half hours in a flask fitted with a vertical tube, whereby water drops are formed in the tube. Cooling is effected, the resulting crude 1-(1-phenylpropyl-2)-4-(3,3-diphenylpropylimino)piperidine is dissolved in 300 cc. of methanol and 2 g. of platinum oxide are added. Hydrogenation is effected at room temperature until hydrogen is no longer taken up, the catalyst is filtered off and 36 cc. of 3.5 N hydrochloric acid in ethanol are added to the filtrate while cooling with ice. Concentration is effected to approximately 50 cc., 100 cc. of ethyl acetate are added, the mixture is allowed to crystallize and the precipitated 1-(1-phenylpropyl-2)-4-(3,3-diphenylpropylamino)piperidine dihydrochloride is filtered off; prisms having a M.P. of 255–260° (noncharacteristic).

The 1-(1-phenylpropyl-2)-4-piperidone used as starting material is obtained as follows:

1-phenyl-2-aminopropane is added to acrylic acid ethyl ester, whereby 1-phenyl-2-[N,N-bis-(2-carbethoxy-ethyl)-amino]propane is obtained, which is cyclized with lithium hydride to give 1-(1-phenylpropyl-2)-3-carbethoxy-4-piperidone (hydrochloride, M.P. 174–176° from ethanol). Upon heating with 20% hydrochloric acid hydrolysis and decarboxylation to 1 - (1 - phenylpropyl - 2) - 4 - piperidone occur (B.P. 155°/0.005 mm. of Hg, temperature measured in the air bath).

Example 3.—1-[2-(3,4-methylenedioxyphenyl)ethyl]-4-(3,3-diphenylpropylamino)piperidine 7.8 g. of 1-[2-(3,4-methylenedioxyphenyl)ethyl]-4-piperidone and 6.6 g. of 3,3-diphenylpropylamine are heated to 110° for one and a half hours in a flask fitted with a vertical tube, whereby water drops are formed in the tube. Cooling is effected, the resulting crude 1-[2-(3,4-methylenedioxyphenyl)ethyl] - 4 - (3,3 - diphenylpropylimino)piperidine is dissolved in 150 cc. of ethanol and 500 mg. of platinum oxide are added. Hydrogenation is effected at room temperature until hydrogen is no longer taken up, the catalyst is filtered off and 17.5 cc. of 3.5 N hydrochloric acid in ethanol are added to the filtrate while cooling with ice. Concentration is subsequently effected until crystallization commences. The precipitated 1-[2-(3,4-methylenedioxyphenyl)ethyl] - 4 - (3,3 - diphenylpropylamino)piperidine dihydrochloride is filtered off and recrystallized from ethanol. M.P. 220–246° (noncharacteristic).

The 1 - [2 - (3,4 - methylenedioxyphenyl)ethyl] - 4 - piperidone used as starting material is obtained as follows:

2-(3,4-methylenedioxyphenyl)ethylamine is added to acrylic acid ethyl ester, whereby N,N-bis-(2-carbethoxy-ethyl) - 2 - (3,4 - methylenedioxyphenyl)ethylamine results, which is cyclized with lithium hydride to give 1-[2-(3,4 - methylenedioxyphenyl)ethyl] - 3 - carbethoxy - 4 - piperidone (hydrochloride, M.P. 195–196° from ethanol/benzene). Upon heating with 20% hydrochloric acid hydrolysis and decarboxylation to 1-[2-(3,4-methylenedioxyphenyl)ethyl]-4-piperidone occur; M.P. 47–49° (from ether).

Example 4.—1-[2-(3,4-dimethoxyphenyl)ethyl]-4-(3,3-diphenylpropylamino)piperidine A mixture of 13.2 g. of 1-[2-(3,4-dimethoxyphenyl)-ethyl]-4-aminopiperidine, 10.5 g. of 3,3-diphenylpropionaldehyde and 100 cc. of benzene is heated to the boil at reflux for 2 hours with the use of a water separator. The reaction mixture is concentrated by evaporation, whereby 1 - [2 - (3,4 - dimethoxyphenyl)ethyl] - 4 - (3,3 - diphenylpropylideneamino)piperidine is obtained as an oil which is crystallized from ether/benzene; M.P. 89–91°.

10 g. of 1-[2-(3,4-dimethoxyphenyl)ethyl]-4-(3,3-diphenylpropylidene-amino)piperidine are dissolved in 100 cc. of ethanol and 500 mg. of platinum oxide are added. Hydrogenation is effected at 40° at normal pressure until hydrogen is no longer taken up, the catalyst is filtered off, 7.5 cc. of concentrated hydrochloric acid are added to the filtrate and the mixture is allowed to crystallize. The precipitated 1-[2-(3,4-dimethoxyphenyl)ethyl]-4-(3,3-diphenylpropylamino)piperidine dihydrochloride sesquihydrate has a M.P. of 260–263° after recrystallization from approximately 90% ethanol.

The starting material may, for example, be produced as follows:

1-[2-(3,4-dimethoxyphenyl)ethyl-4-piperidone is condensed with benzylamine to give 1-[2-(3,4-dimethoxyphenyl)ethyl]-4-benzyliminopiperidine, which is hydrogenated as crude product without purification in the presence of a platinum catalyst to give 1-[2-(3,4-dimethoxyphenyl)ethyl] - 4 - benzylaminopiperidine; M.P. 45–46° from ligroin. Debenzylation with hydrogen in the presence of a palladium catalyst yields 1-[2-(3,4-dimethoxyphenyl)ethyl]-4-aminopiperidine; B.P. 127°/0.005 mm. of Hg.

Example 5.—1-[2-(3,4-dimethoxyphenyl)ethyl]-4-(3,3-diphenylpropylamino)piperidine 8 cc. of pyridine are added to a solution of 13.2 g. of 1-[2-(3,4-dimethoxyphenyl)ethyl]-4 - aminopiperidine in 100 cc. of toluene, a solution of 12.8 g. of 3,3-diphenylpropionyl chloride in 50 cc. of toluene is added dropwise while stirring and the mixture is stirred at 70° for one hour. After cooling shaking out is effected thrice with a 1 N aqueous sodium hydroxide solution, the organic phase is dried over magnesium sulphate and the solvent is evaporated at reduced pressure. The resulting crude 1 - [2 - (3,4-dimethoxyphenyl)ethyl] - 4 - (3,3-diphenylpropionylamino)piperidine is recrystallized from chloroform/ethyl acetate; M.P. 142–143°.

13.8 g. of 1-[2-(3,4-dimethoxyphenyl)ethyl]-4-(3,3-diphenylpropionylamino)piperidine in 300 cc. of dioxane are heated to 100° for 3 hours with 1.95 g. of lithium aluminium hydride. Methanol is added dropwise to the reaction mixture, a saturated aqueous sodium sulphate solution is subsequently added and filtration is effected; the filtrate is concentrated by evaporation. The oily residue is dissolved in 100 cc. of ethanol and 6 cc. of concentrated hydrochloric acid are added, whereupon 1-[2-(3,4-dimethoxyphenyl)ethyl] - 4 - (3,3-diphenylpropylamino)piperidine dihydrochloride sesquihydrate crystallizes in the form of needles having a M.P. of 260–263°.

Example 6.—1 - [2-(3,4-dimethoxyphenyl)ethyl]-4-(3,3-diphenylpropylamino)piperidine 26.5 g. of 1-[2-(3,4-dimethoxyphenyl)ethyl]-4-aminopiperidine and 11.5 g. of 3,3-diphenylpropyl chloride in 100 cc. of benzene are heated to the boil at reflux for 20 hours. After cooling the reaction mixture is shaken out with water and the organic phase which has been dried over magnesium sulphate is concentrated by evaporation. The compound indicated in the heading is obtained as residue and is converted into its dihydrochloride sesquihydrate, having a M.P. of 260–263°, in ethanolic solution with concentrated hydrochloric acid.

Example 7.—1 - [2-(3,4,5-trimethoxyphenyl)ethyl]-4-[N-benzyl-N-(3,3-diphenylpropyl)amino]piperidine and 1-[2-(3,4,5-trimethoxyphenyl)ethyl] - 4 - (3,3-diphenylpropylamino)piperidine A solution of 6.4 g. of 3,4,5-trimethoxyphenyl-acetic acid chloride in 50 cc. of toluene is added dropwise while stirring to a solution of 10.0 g. of 4-[N-benzyl-N-(3,3-diphenylpropyl)amino]piperidine and 2.1 cc. of pyridine in 100 cc. of toluene. The mixture is stirred at room temperature for 10 minutes and 200 cc. of water are then added.

The toluene phase is separated, is shaken out twice with 50 cc. of 1 N sodium hydroxide solution, dried over magnesium sulphate and concentrated by evaporation at reduced pressure. 1-(3,4,5-trimethoxyphenylacetyl)-4-[N-benzyl - N - (3,3-diphenylpropyl)amino]piperidine is obtained as a light brown resin which is worked up without further purification.

7.1 g. of 1-(3,4,5-trimethoxyphenylacetyl)-4-[N-benzyl-N-(3,3-diphenylpropyl)amino]piperidine in 150 cc. of tetrahydrofuran are heated to the boil while stirring with 1.5 g. of lithium aluminium hydride for 40 minutes. Methanol is added dropwise to the reaction mixture and after the addition of a saturated aqueous sodium sulphate solution filtration is effected; the filtrate is concentrated by evaporation. The oily crude product is dissolved in 50 cc. of ethanol, 5 cc. of concentrated hydrochloric acid are added and concentration is effected until crystallization occurs. 1-[2-(3,4,5-trimethoxyphenyl)ethyl]-4-[N-benzyl-N-(3,3-diphenylpropyl)amino]piperidine dihydrochloride crystallizes from ethanol in prism druses having a M.P. of 232–234° (decomposition).

A solution of 13.6 g. of 1-[2-(3,4,5-trimethoxyphenyl)-ethyl] - 4-[N-benzyl-N-(3,3-diphenylpropyl)amino]piperidine dihydrochloride in 250 cc. of methanol is shaken with hydrogen in the presence of a palladium catalyst (10% on aluminium oxide). When the taking up of hydrogen stops the catalyst is filtered off and the filtrate is concentrated at reduced pressure until crystallization commences. 1 - [2-(3,4,5-trimethoxyphenyl)ethyl]-4-(3,3-diphenylpropylamino)piperidine dihydrochloride crystallizes from ethanol in the form of needles having a M.P. of 255–257° (decomposition).

The starting material may, for example, be produced as follows:

1-benzoylpiperidone-4 is condensed in alcoholic solution with 3,3-diphenylpropylamine to give 1-benzoyl-4-(3,3-diphenylpropylimino)piperidine, which is hydrogenated as such with hydrogen in the presence of a platinum catalyst to give 1-benzoyl-4-(3,3-diphenylpropylamino)piperidine; M.P. 185–193°/0.005 mm. of Hg. Benzylation with benzyl bromide in the presence of an acid binding agent, e.g., a second mol of 1-benzoyl-4-(3,3-diphenylpropylamino)piperidine, yields 1-benzoyl-4-[N-benzyl-N-(3,3-diphenylpropyl)amino]piperidine (M.P. of the hydrochloride 230–232° from methanol/ethyl acetate).

Hydrolysis of 1-benzoyl-4-[N-benzyl-N-(3,3-diphenylpropyl)amino]piperidine hydrochloride with aqueous-alcoholic hydrochloric acid yields 4-[N-benzyl-N-(3,3-diphenylpropyl)amino]piperidine (distilled in an air bath at 190°/0.005 mm. of Hg; M.P. of the crystalline distillates 65–68°).

Example of a galenical preparation: tablets:

| | Gram |
|---|---|
| 1-[2-(3,4-dimethoxyphenyl)ethyl]-4-(3,3 - diphenylpropylamino)piperidine dihydrochloride sesquihydrate, $C_{30}H_{38}N_2O_2 \cdot 1\frac{1}{2}H_2O$ compound of Example 1) | [1]0.0609 |
| Stearic acid | 0.0020 |
| Polyvinyl pyrrolidone | 0.0050 |
| Talcum | 0.0050 |
| Maize starch | 0.010 |
| Lactose | 0.0771 |
| For a tablet of | 0.160 |

[1] Corresponds to 0.050 g. of the free base.

What is claimed is:

1. A compound selected from the group consisting of a compound of formula:

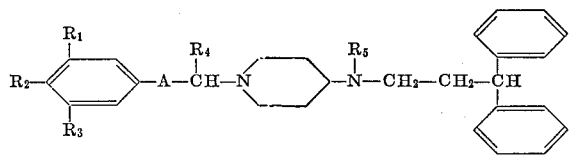

in which either each of $R_1$, $R_2$ and $R_3$ is hydrogen or methoxy, or $R_1$ is hydrogen, and $R_2$ and $R_3$ together are methylenedioxy, A is methylene, $R_4$ is hydrogen or methyl, and $R_5$ is hydrogen or benzyl, and the pharmaceutically acceptable acid addition salts thereof.

2. A compound according to claim 1, in which the compound is selected from the group consisting of 1-[2-(3,4-dimethoxyphenyl)ethyl] - 4-(3,3-diphenylpropylamino)-piperidine and the pharmaceutically acceptable acid addition salts thereof.

3. A compound according to claim 1, in which the compound is selected from the group consisting of 1-(1-phenylpropyl - 2)-4-(3,3-diphenylpropylamino)-piperidine and the pharmaceutically acceptable acid addition salts thereof.

4. A compound according to claim 1, in which the compound is selected from the group consisting of 1-[2-(3,4-methylenedioxyphenyl)ethyl] - 4 - (3,3 - diphenylpropylamino) piperidine and the pharmaceutically acceptable acid addition salts thereof.

5. A compound according to claim 1, in which the compound is selected from the group consisting of 1-[2-(3,4,5-trimethoxyphenyl)ethyl] - 4-[N-benzyl-N-(3,3-diphenylpropyl)amino]piperidine and the pharmaceutically acceptable acid addition salts thereof.

6. A compound according to claim 1, in which the compound is selected from the group consisting of 1-[2-(3,4-5-trimethoxyphenyl)ethyl] - 4 - (3,3-diphenylpropylamino) piperidine and the pharmaceutically acceptable acid addition salts thereof.

7. A compound selected from the group consisting of a compound of formula:

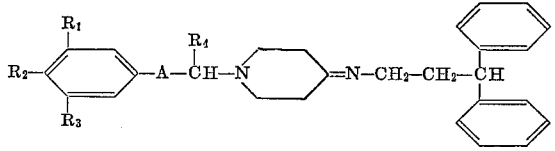

in which either each of $R_1$, $R_2$ and $R_3$ is hydrogen or methoxy, or $R_1$ is hydrogen, and $R_2$ and $R_3$ together are methylenedioxy, A is methylene and $R_4$ is hydrogen or methyl.

8. A compound selected from the group consisting of a compound of formula:

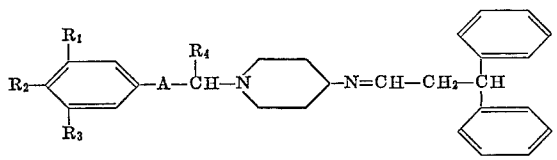

in which either each of $R_1$, $R_2$ and $R_3$ is hydrogen or methoxy, or $R_1$ is hydrogen, and $R_2$ and $R_3$ together are methylenedioxy, A is methylene and $R_4$ is hydrogen or methyl.

9. A compound selected from the group consisting of a compound of formula:

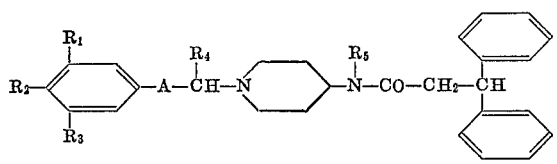

in which either each of $R_1$, $R_2$ and $R_3$ is hydrogen or methoxy, or $R_1$ is hydrogen, and $R_2$ and $R_3$ together are methylenedioxy, A is methylene, $R_4$ is hydrogen or methyl, and $R_5$ is hydrogen or benzyl.

10. 4 - [N-benzyl-N - (3,3 - diphenylpropyl)amino]piperidine.

11. A compound selected from the group consisting of a compound of formula:

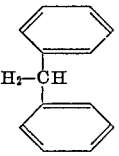

in which either each of $R_1$, $R_2$ and $R_3$ is hydrogen or methoxy, or $R_1$ is hydrogen, and $R_2$ and $R_3$ together are methylenedioxy, A is methylene, and $R_5$ is hydrogen or benzyl.

References Cited

Harper et al.: J. Med. Chem., vol. 7, pp. 729–32 (1964).

HENRY R. JILES, *Primary Examiner.*

G. T. TODD, *Assistant Examiner.*

U.S. Cl. X.R.

260—293, 294, 294.7; 424—267